United States Patent [19]

Clark

[11] 3,798,986

[45] Mar. 26, 1974

[54] PRE-SELECTOR GEAR SHIFT FOR BICYCLE

[76] Inventor: Marion A. Clark, 546 W. Pleasant, Tulare, Calif. 93274

[22] Filed: Feb. 26, 1973

[21] Appl. No.: 335,882

[52] U.S. Cl. ............................................. 74/217 B
[51] Int. Cl. ........................................... F16h 11/04
[58] Field of Search ................................... 74/217 B

[56] References Cited
UNITED STATES PATENTS
1,826,565  10/1931  Murase............................ 74/217 B
3,653,273  4/1972  Albertson et al.................. 74/217 B FOREIGN PATENTS OR APPLICATIONS
996,149  10/1950  France............................. 74/217 B
998,216  1/1952  France............................. 74/217 B

*Primary Examiner*—Leonard H. Gerin
*Attorney, Agent, or Firm*—Brown & Martin

[57] ABSTRACT

A pre-selector gear shift for a bicycle, utilizing dual pedal driven sprockets coupled by chains to dual derailleur type gear units at the rear wheel. In the pedal supporting hub is a clutch mechanisms, with an actuating lever for coupling either sprocket selectively to the pedals, so that only one derailleur unit is driven at a time. The actuating lever also operates gear shift means with cable connections to the derailleur units, allowing the non-operating unit to be shifted to a preselected drive ratio while the other unit is in drive operation. A simple positive motion of the lever then engages the pre-selected drive coupling.

9 Claims, 5 Drawing Figures

PATENTED MAR 26 1974
3,798,986
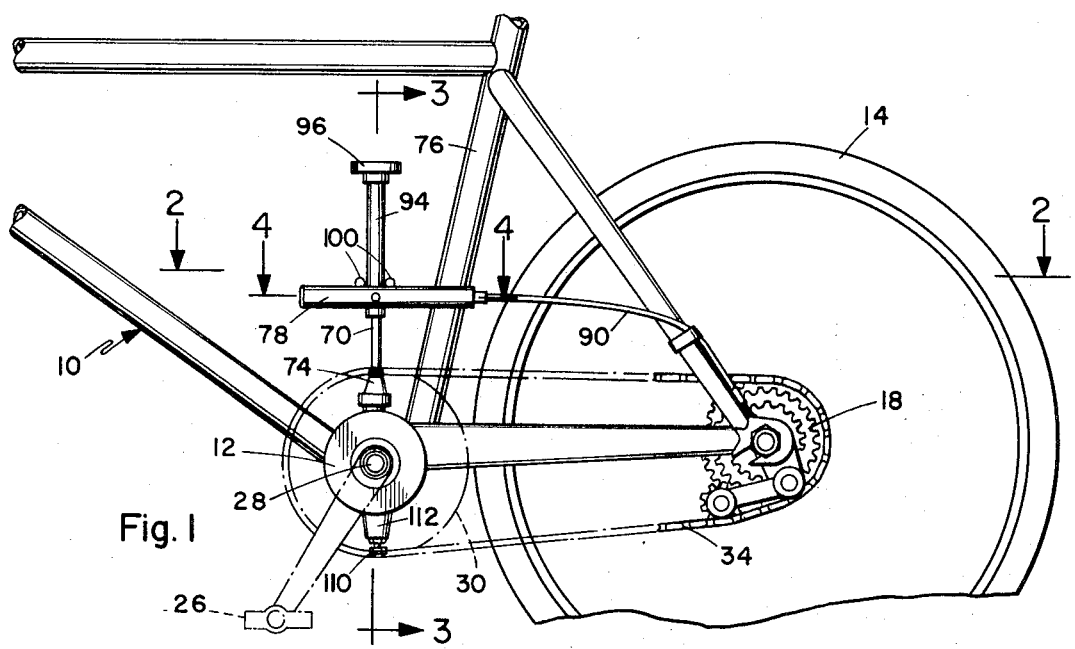
Fig. 1
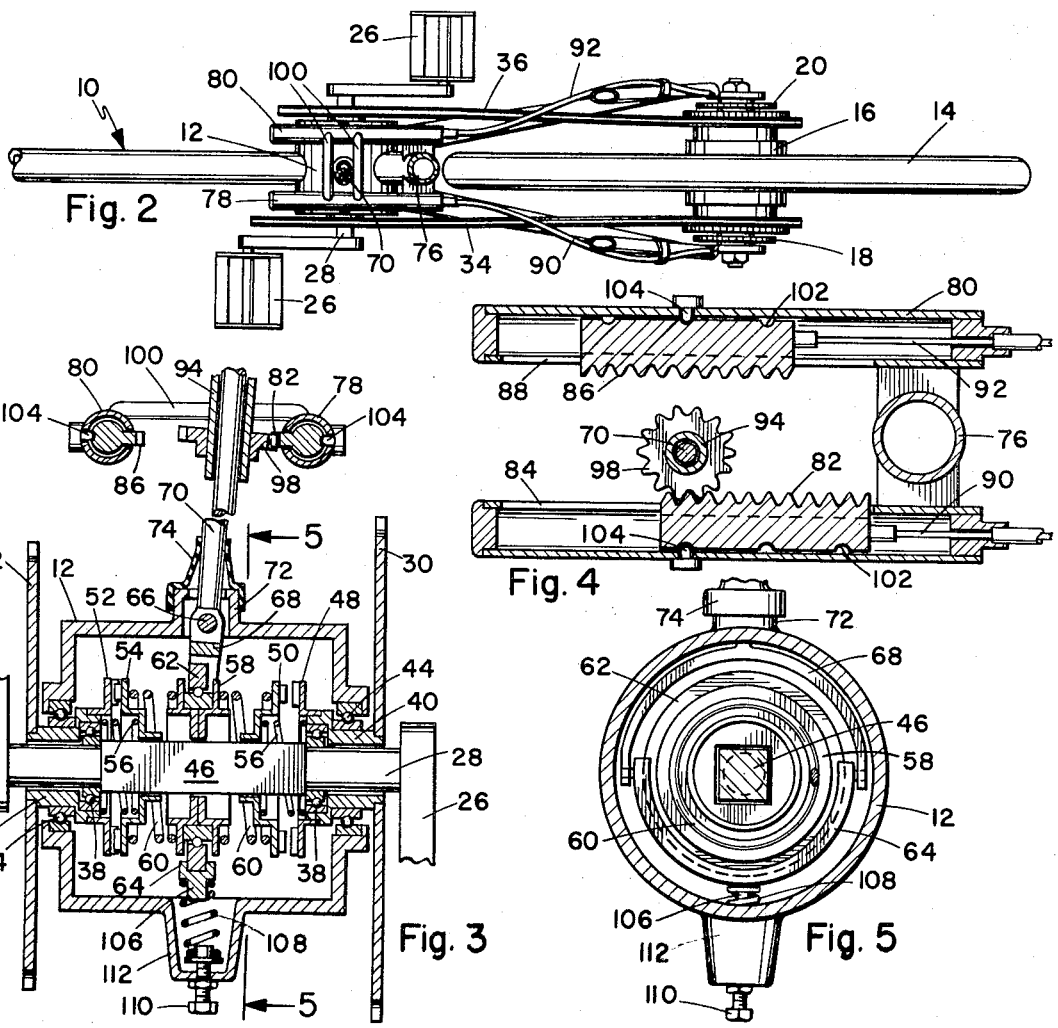

PRE-SELECTOR GEAR SHIFT FOR BICYCLE

BACKGROUND OF THE INVENTION

In multiple gear ratio bicycle drives, such as the derailleur type, there are usually two levers for shifting gears, one actuating for the mechanism at the rear wheel hub and the other selecting different sprockets at the pedals. The levers and their motions are quite small and indexing is not usually very apparent. As a result, considerable practice is necessary to shift correctly to a specific gear ratio. Also, with the drive chain being shifted between sprockets at both ends, there is more possibility of the chain slipping off.

SUMMARY OF THE INVENTION

The gear shift mechanism described herein utilizes two derailleur type gear units at the rear wheel hub, driven by separate chains from dual sprockets at the pedals. In the pedal supporting hub are dual clutches which are selectively engageable to couple either sprocket to the pedal shaft, so that either derailleur unit can be used to propel the bicycle. A lever extending from the clutch mechanism is moved from side to side through a short distance and between positive stops, to engage one clutch or the other.

Each derailleur unit is actuated by a conventional type cable connected to a toothed rack, which is slidably mounted in a shift indexing member. The indexing members are mounted on the bicycle frame straddling the clutch actuating lever, the lever carrying a pinion which engages one of the toothed racks in each clutch position and provides a positive stopped position for the lever. Rotation of the pinion by a suitable control knob on the lever shifts the selected derailleur unit to the required gear ratio. One derailleur unit is in clutched engagement with the pedal shaft while the other is in shift engagement with the rack and pinion mechanism. Thus a specific gear ratio can be pre-selected on one derailleur unit while the other is in driving operation. To change speeds the lever is simply moved to the opposite side to engage the other clutch and put the pre-selected derailleur unit in driving engagement, while the unit previously in use is released for further gear selection as necessary.

The primary object of this invention, therefore, is to provide a new and improved pre-selector gear shift for a bicycle.

Another object of this invention is to provide a gear shift system having dual drive means, one of which is in operation while the other is idle and free for shifting.

Another object of this invention is to provide a new and improved gear shift system in which the pre-selection gear shifting and the shifting between the dual drives are controlled by a single, readily accessible lever.

A further object of this invention is to provide a new and improved gear shift system which is adaptable to conventional derailleur type multiple speed gear mechanisms.

Other objects and many advantages of this invention will become more apparent upon a reading of the following detailed description and an examination of the drawing, wherein like reference numerals designate like parts throughout and in which:

FIG. 1 is a side elevation view of the rear portion of a bicycle incorporating the pre-selector gear shift mechanism.

FIG. 2 is a sectional view taken on line 2—2 of FIG. 1.

FIG. 3 is an enlarged sectional view taken on line 3—3 of FIG. 1.

FIG. 4 is an enlarged sectional view taken on line 4—4 of FIG. 1.

FIG. 5 is a sectional view taken on line 5—5 of FIG. 3.

DESCRIPTION OF THE PREFERRED EMBODIMENT

The mechanism is illustrated as being installed on a typical bicycle frame 10 having a pedal supporting hub or housing 12 and a rear wheel 14 with a hub 16. Mounted on opposite sides of hub 16 are conventional derailleur type gear units 18 and 20, which are fixed to the wheel since freewheeling action occurs at the pedals, as hereinafter described. The gear units may each have any convenient number of sprockets, three being shown as an example.

Pedals 26 are mounted on shaft 28, which is journalled in housing 12, the shaft carrying dual drive sprockets 30 and 32 of different sizes on opposite sides of the housing. Sprocket 30 is coupled to gear unit 18 by a drive chain 34, and sprocket 32 is coupled to gear unit 20 by a similar chain 36. The shaft 28 is supported in bearings 38 in a pair of hubs 40 and 42 which, in turn, are supported in bearings 44 in the housing 12. Sprocket 30 is fixed on hub 40 and sprocket 32 is fixed on hub 42, so that shaft 28 can rotate independently of the sprockets. The central portion 46 of shaft 28, between hubs 40 and 42, is of square or otherwise non-circular cross section to provide a drive coupling.

Fixed on the inner end of hub 40 is a clutch disc 48 and on the shaft portion is ratchet disc 50, which is axially slidable but non-rotatable, to engage with the clutch disc. On the inner end of hub 42 is a similar clutch disc 52, and on shaft portion 46 is a similar ratchet disc 54. The two ratchet clutches have teeth or other such inter-engaging means which provide a drive coupling in the forward drive direction, but slip in the reverse direction. Each clutch and ratchet disc pair is held apart by a light separator spring 56. Between the ratchet discs is a shaft collar 58, also axially slidable but non-rotatable on shaft portion 46. Between the shift collar 58 and the ratchet discs are load springs 60, which are heavy enough to overcome the separator springs 56 when the shift collar is moved to one side or the other.

The shift collar 58 carries an annular bearing 62, the outer lower portion of which is held in a semi-circular saddle 64. Pivotally mounted on a hinge pin 66 in the upper portion of housing 12 is a yoke 68, which straddles the shift collar and is pivotally connected to a saddle 64. By swinging yoke 88 the shift collar can be moved toward either end of the shaft, while rotating with the shaft in bearing 62. On the top of yoke 68 is a shift lever 70, extending upwardly through a boss 72 on top of housing 12. The opening is sealed by a flexible boot 74.

Fixed to the rear post 76 of frame 10 and extending forwardly on opposite sides are parallel guide tubes 78 and 80. Slidably mounted in guide tube 78 is a toothed rack 82, the teeth of which project through a longitudinal slot 84 in the inner side of the tube. In guide tube 80 is a similar toothed rack 86, with the teeth projecting through a slot 88. The toothed racks are thus in horizontally opposed parallel alignment. Rack 82 is connected to gear unit 18 by the conventional actuating cable 90, and rack 86 is similarly connected to gear unit 20 by a cable 92.

The upper portion of shift lever 70 comprises a rotatable sleeve 94 with a suitable selector knob 96 on the upper end. On the lower end of sleeve 94 is a pinion 98, positioned to engage either rack 82 or 86. Side to side motion of the shift lever 70 is guided by guide bars 100 secured between the tubes 78 and 80, which also reinforce the structure. Each of the racks 82 and 86 has longitudinally spaced indexing sockets 102, which are selectively engaged by spring detents 104. The sockets are spaced at suitable positions to hold the respective racks and their connected cables at the different selected gear positions of gear units 18 and 20. By engaging pinion 98 with rack 82 and rotating knob 96, gear unit 18 can be shifted to any one of the three ratios, the detent providing indication by feel of the correct positioning. Similarly, the pinion is engaged with rack 86 to shift gear unit 20.

To hold the shift lever at one side or the other, the lower portion of saddle 64 has a pin 106 which seats in the upper end of an over-center biasing spring 108. The lower end of spring 108 is held on an adjustment screw 110 in a lower extension 112 of housing 12. With proper design of the ratchet clutch mechanism, the pressure required to maintain a driving connection can be minimized, and the over-center action of spring 108 is easily adjusted to hold the shift lever against the clutch springs.

With reference to FIG. 3, it will be seen that the ratchet and clutch discs 54 and 52 are in driving engagement, coupling sprocket 32 to gear unit 20. Rack 86, which is connected to that gear unit, is set in the required gear ratio position. At the same time, ratchet and clutch discs 50 and 48 are spaced apart and sprocket 30 is not being driven, the gear unit 18 being in freewheeling operation. Rack 78, which is connected to gear unit 18, is engaged by pinion 98 and can be adjusted to pre-select the next gear ratio to be used. While one gear ratio is in use, the next can thus be pre-selected and, when the change is required, the only action necessary is to move the shift lever the short distance from one side to the other.

In shifting from low to higher gear ratios, it is not necessary to stop pedalling, since the ratch clutch being engaged will be operating at a higher speed and will take up the load. When shifting down it is desirable to hesitate slightly in pedalling, to allow the higher ratio ratchet clutch to disengage. For riding on reasonably level terrain in stop and go conditions two suitable gear ratios can be pre-set and used selectively for most riding merely by moving the shift lever from side to side. The overall operation is much simpler than with the usual two lever derailleur system and is positive in action.

Having described my invention, I now claim:

1. A pre-selecter gear shift mechanism for a bicycle having a frame with a pedal supporting housing, pedals mounted on the housing, and a driven rear wheel, the mechanism comprising:

a pair of multiple sprocket gear units mounted on opposite sides of said wheel, each including actuating means for shifting a drive chain to selective sprockets;
a pair of drive sprockets mounted on said housing;
drive chains connecting each of said sprockets to one of said gear units;
a pedal shaft journalled in said housing;
clutch means in said housing for engaging said pedal shaft with said drive sprockets;
a shift lever connected to said clutch means for selective engagement thereof;
gear selecting means connected to said shift lever;
said gear selecting means being coupled to said actuating means for selective operation of the drive chain on the gear unit not in clutched engagement with said pedal shaft.

2. A pre-selector gear shift mechanism according to claim 1, wherein said shift lever is pivotally mounted on said housing for movement from side to side;
said gear selecting means including a pair of toothed racks mounted on said frame for longitudinal sliding motion on opposite sides of said shift lever;
and a pinion rotatably mounted on said shift lever for selective engagement with said racks.

3. A pre-selector gear shift mechanism according to claim 2, wherein said acutating means comprises cable connected between said racks and said gear unit.

4. A pre-selector gear mechanism according to claim 3, and including guide tubes in which said racks are slidable, said guide tubes being fixed to said frame;
and guide bars secured betwen said tubes on opposite sides of said shift lever to guide the side to side motion of the lever.

5. A pre-selector gear shift mechanism according to claim 3, wherein each of said drive sprockets has a hub journalled in said housing, said pedal shaft being journalled in said hubs;
said clutch means interconnecting said shaft and said hubs.

6. A pre-selector gear mechanism according to claim 5, wherein said clutch means includes a clutch disc fixed on each of said hubs, and a pair of ratchet discs axially slidable and non-rotatably mounted on said shaft;
said shift lever being coupled to said ratchet discs for selective engagement thereof with the clutch discs.

7. A pre-selector gear mechanism according to claim 6, and including a shft collar axially slidable on said shaft between said ratchet discs, said shift lever being pivotally connected to said collar;
and spring biasing means between said collar and each of said ratchet discs.

8. A pre-selector gear mechanism according to claim 7, and including separator springs between each ratchet disc and the associated clutch disc;
said biasing means comprising load springs having greater effective spring pressure than said separator springs.

9. A pre-selector gear mechanism according to claim 8, and including over-center biasing means connected to said shift collar for holding the shift lever in each selected position.

* * * * *